US009583005B2

(12) United States Patent
Kommuri et al.

(10) Patent No.: US 9,583,005 B2
(45) **Date of Patent: *Feb. 28, 2017**

(54) AIRCRAFT MONITORING WITH IMPROVED SITUATIONAL AWARENESS

(71) Applicant: HONEYWELL INTERNATIONAL INC., Morristown, NJ (US)

(72) Inventors: Sravan Kommuri, Andhra Pradesh (IN); Karthikeya Chiruvolu, Andhra Pradesh (IN); Kumaran Nehru, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/283,441

(22) Filed: May 21, 2014

(65) Prior Publication Data

US 2014/0247163 A1 Sep. 4, 2014

Related U.S. Application Data

(63) Continuation of application No. 13/296,943, filed on Nov. 15, 2011, now Pat. No. 8,760,319.

(51) Int. Cl.

*G01C 23/00* (2006.01)
*G08G 5/00* (2006.01)

(52) U.S. Cl.

CPC ......... *G08G 5/0013* (2013.01); *G08G 5/0021* (2013.01); *G08G 5/0026* (2013.01); *G08G 5/0039* (2013.01); *G08G 5/0052* (2013.01); *G08G 5/0082* (2013.01); *G08G 5/0086* (2013.01); *G08G 5/0091* (2013.01); *G08G 5/0078* (2013.01)

(58) Field of Classification Search

CPC ........................................................ G06G 7/76
USPC ....... 340/961, 945, 963, 971, 973; 701/9, 14
See application file for complete search history.

(56) References Cited

U.S. PATENT DOCUMENTS 4,812,990 A 3/1989 Adams et al.
4,862,373 A 8/1989 Meng
5,265,024 A 11/1993 Crabill et al.
5,835,059 A * 11/1998 Nadel et al. .................. 342/398
6,014,606 A 1/2000 Tu
6,289,277 B1 9/2001 Feyereisen et al.
(Continued)

FOREIGN PATENT DOCUMENTS

EP 2330583 A2 6/2011
EP 2362183 A2 8/2011
(Continued)

OTHER PUBLICATIONS

EP Search Report, EP 12191887.4-1803/2595136 dated Jan. 30, 2014.

(Continued)

*Primary Examiner* — Brent Swarthout
(74) *Attorney, Agent, or Firm* — Lorenz & Kopf, LLP

(57) ABSTRACT

Methods and systems are provided for monitoring an aircraft. An exemplary method involves capturing, by a computing system at a ground location, a flight tracking image associated with the aircraft that is displayed on a first display device at the ground location, and communicating the captured flight tracking image to the aircraft for display on a second display device onboard the aircraft.

19 Claims, 5 Drawing Sheets

(56) References Cited

U.S. PATENT DOCUMENTS

| | | | | |
|---|---|---|---|---|
| 6,441,773 | B1 | 8/2002 | Kelly et al. | |
| 7,027,898 | B1 | 4/2006 | Leger et al. | |
| 7,039,505 | B1 | 5/2006 | Southard et al. | |
| 7,363,152 | B2 | 4/2008 | Sjanic | |
| 8,314,816 | B2 | 11/2012 | Feyereisen | |
| 8,538,669 | B2 | 9/2013 | Agarwal et al. | |
| 8,760,319 | B2 | 6/2014 | Kommuri | |
| 2002/0039072 | A1 | 4/2002 | Gremmert et al. | |
| 2005/0049762 | A1 | 3/2005 | Dwyer | |
| 2007/0162197 | A1 | 7/2007 | Fleming | |
| 2008/0158049 | A1 | 7/2008 | Southard et al. | |
| 2009/0109065 | A1 | 4/2009 | Pinheiro | |
| 2010/0198489 | A1 | 8/2010 | Rozovski et al. | |
| 2010/0309222 | A1 | 12/2010 | Feyereisen | |
| 2011/0029234 | A1 | 2/2011 | Desai et al. | |
| 2011/0257818 | A1 * | 10/2011 | Ganz ........................ | G01W 1/00 701/14 |
| 2013/0080042 | A1 | 3/2013 | Estkowski et al. | |
| 2013/0085669 | A1 | 4/2013 | Bailey et al. | |
| 2013/0120166 | A1 | 5/2013 | Kommuri | |

FOREIGN PATENT DOCUMENTS

| | | | |
|---|---|---|---|
| WO | 0236428 | A2 | 5/2002 |
| WO | 2011128835 | A2 | 10/2011 |

OTHER PUBLICATIONS

EP Exam Report, EP 12191887.4 dated Feb. 13, 2014.

Scanlon, C.H.; A Graphical Weather System Design for the NASA Transport Systems Research Vehicle B-737; NASA Technical Memorandum 104205; Feb. 1992.

Frolik P., et al; Onboard Weather Radar Flight Strategy System with Bandwidth Mangement; U.S. Appl. No. 14/261,177, filed Apr. 24, 2014.

USPTO Office Action for U.S. Appl. No. 13/296,943 dated Aug. 22, 2013.

USPTO Office Action for U.S. Appl. No. 13/296,943 dated Dec. 11, 2013.

Notice of Allowance for U.S. Appl. No. 13/296,943 dated Feb. 13, 2014.

Supplemental Notice of Allowance for U.S. Appl. No. 13/296,943 dated Apr. 29, 2014.

Supplemental Notice of Allowance for U.S. Appl. No. 13/296,943 dated Apr. 30, 2014.

Tieftrunk, P. et al.; Aircraft Monitoring with Improved Situational Awareness; U.S. Appl No. 14/462,886, filed Aug. 19, 2014.

EP Examination Report for Application No. 12191887.4 dated Jul. 22, 2015.

USPTO Office Action for U.S. Appl. No. 14/462,886; Notification Date Nov. 20, 2015.

EP Examination Report for Application No. 12191887.4 dated Dec. 19, 2014.

Extended EP search report for Application No. 15180314.5-1803/2988286 dated Jan. 27, 2016.

EP Communication for Application No. 12191887.4-1803/2595136 dated Jul. 20, 2016.

* cited by examiner

500

AIRCRAFT MONITORING WITH IMPROVED SITUATIONAL AWARENESS

CROSS-REFERENCE TO RELATED APPLICATIONS

This is a continuation of U.S. patent application Ser. No. 13/296,943, filed Nov. 15, 2011, now U.S. Pat. No. 8,760,319.

TECHNICAL FIELD

The subject matter described herein relates generally to avionics systems, and more particularly, embodiments of the subject matter relate to providing flight tracking images to aircraft for improved situational awareness.

BACKGROUND

Airlines and other aircraft operators utilize various personnel on the ground to monitor and provide weather, air traffic, and other relevant information to pilots that supplements the information provided to pilots via air traffic control, automatic terminal information service (ATIS), onboard instrumentation, and the like. For example, ground personnel may track the flight of an aircraft while concurrently monitoring weather (e.g., using Doppler radar or the like), and notify the pilot of the aircraft prior to the aircraft encountering an impending weather hazard. In this situation, the ground personnel may communicate a data link message to the pilot that describes the upcoming weather or suggests an alternative route (e.g., a different flight path, flight level, destination, or the like) to avoid the weather. However, the pilot is often deprived of the ability to independently analyze the information being relied on by the ground personnel, and therefore, lacks situational awareness when determining how to proceed with operating the aircraft.

BRIEF SUMMARY

Methods are provided for monitoring an aircraft. An exemplary method involves capturing, by a computing system at a ground location, a flight tracking image associated with the aircraft that is displayed on a first display device at the ground location, and communicating the captured flight tracking image to the aircraft for display on a second display device onboard the aircraft.

In another embodiment, an apparatus is provided for a computer-readable medium having computer-executable instructions or data stored thereon executable by a processing system. When executed, the instructions cause the processing system to display, on a first display device coupled to the processing system, a flight tracking map associated with an aircraft, capture the flight tracking map displayed on the first display device, resulting in a captured flight tracking image, and communicate the captured flight tracking image to the aircraft for display on a second display device onboard the aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein relate to systems and methods for communicating and displaying captured flight tracking images on a display device onboard an aircraft to improve situational awareness of the pilot and/or co-pilot. As described in greater detail below, ground personnel monitoring the flight of the aircraft on a display device on the ground may capture the current state of the flight tracking display, provide textual information annotating or otherwise explaining the captured flight tracking image, and communicate the captured flight tracking image and textual information to the aircraft. The captured flight tracking image and the textual information are concurrently displayed or otherwise displayed in association with one another on a display device onboard the aircraft, thereby allowing the pilot and/or co-pilot to utilize both the captured flight tracking image and the feedback and/or comments provided by the ground personnel when formulating a decision on how to operate the aircraft. In exemplary embodiments, the capture flight tracking image includes graphical representations of one or more meteorological regions or other aviation regions of interest identified by one or more external sources of meteorological and/or aviation-related information, such as, for example, Doppler radar weather systems, significant meteorological information (SIGMET) reporting systems, notice to airmen (NOTAM) reporting systems, pilot report (PIREP) reporting systems, and the like. In this regard, the capture flight tracking image may depict meteorological and/or other aviation-related information that is not available to the pilot and/or co-pilot of the aircraft using onboard instrumentation.

Figure 1:
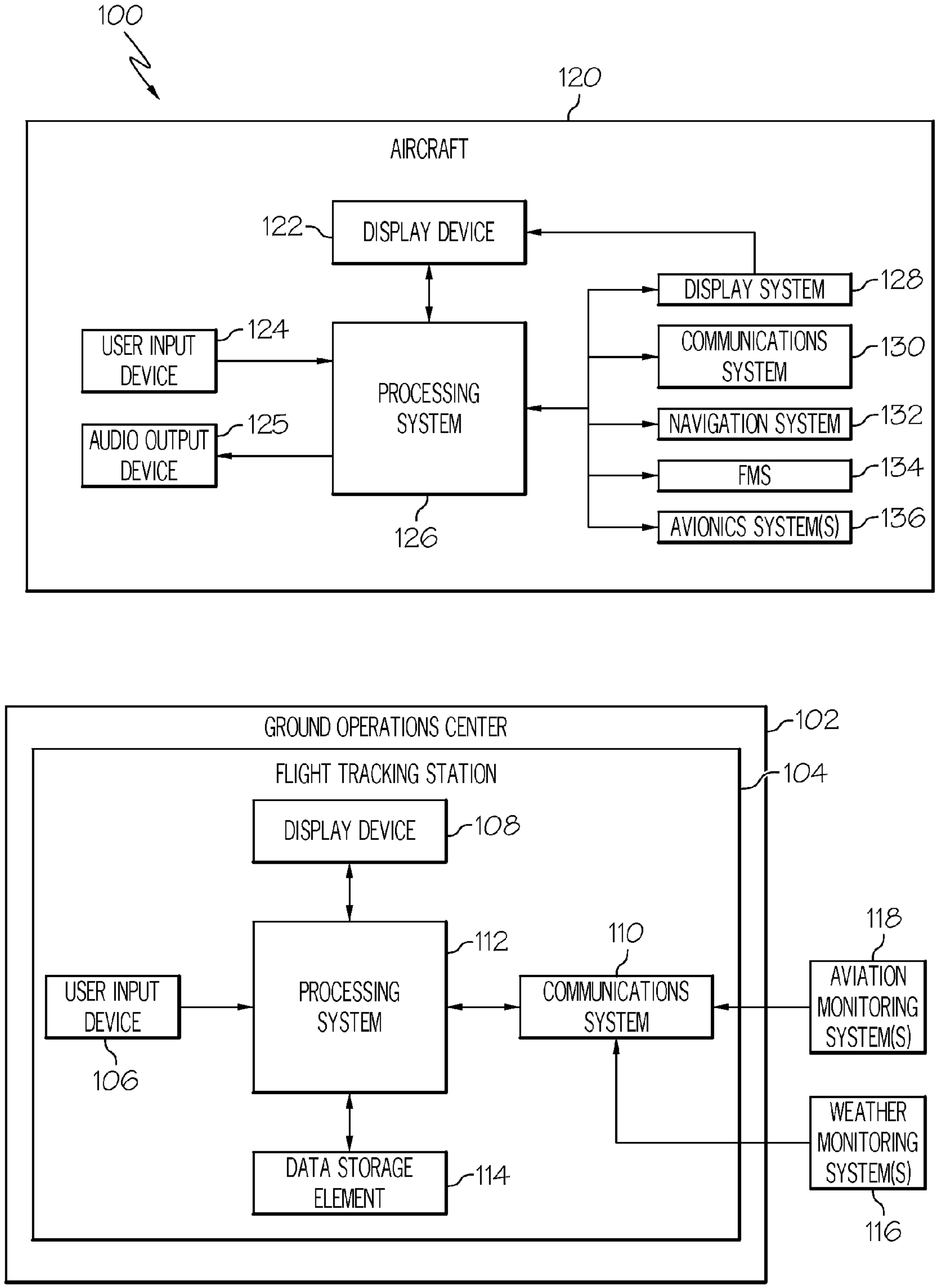
FIG. 1 is a block diagram of a flight tracking system in an exemplary embodiment.

FIG. 1 depicts an exemplary embodiment of a flight tracking system 100 for an aircraft 120. The illustrated system 100 includes a flight tracking station 104 at a ground operations center 102 that communicates with the aircraft 120 to provide flight tracking images and related textual messages to the aircraft 120 for graphical presentation to a pilot, co-pilot, or another crew member on a display device 122 onboard the aircraft 120, as described in greater detail below in the context of FIGS. 2-3.

In the illustrated embodiment of FIG. 1, the ground operations center 102 generally represents a facility located on the ground that includes one or more flight tracking stations 104 equipped to track, analyze, and otherwise monitor operations of one or more aircraft 120. In this regard, the flight tracking station 104 generally represents a computer or other computing system at the ground operations center 102 that may be operated by ground personnel to monitor and track the flight of the aircraft 120. In an exemplary embodiment, the flight tracking station 104 includes a user input device 106, a display device 108, a communications system 110, a processing system 112, and a data storage element 114. In exemplary embodiments, the display device 108 is realized as an electronic display coupled to the processing system 112 that is capable of graphically displaying a flight tracking display that includes information or other data associated with operation of the aircraft 120 under control of the processing system 112, as described in greater detail below. The user input device 106 is coupled to the processing system 112, and the user input device 106 and the processing system 112 are cooperatively configured to allow a user (e.g., ground personnel monitoring aircraft 120) to interact with the flight tracking station 104 to capture the flight tracking display on the display device 108 and communicate captured flight tracking images along with related textual messages to the aircraft 120, as described in greater detail below. Depending on the embodiment, the user input device 106 may be realized as a keypad, touchpad, keyboard, mouse, touch panel (or touchscreen), joystick, knob, line select key or another suitable device adapted to receive input from a user, such as an audio input device, such as a microphone, audio transducer, audio sensor, or the like.

The communications system 110 generally represents the combination of hardware, software, firmware and/or other components configured to support communications between the flight tracking station 104 and the aircraft 120, such as, for example, using data link avionics, a data link infrastructure, and/or a data link service provider. Additionally, the communications system 110 includes hardware, software, firmware and/or a combination thereof adapted to receive communications from one or more external sources of information, such as, for example, one or more external weather monitoring systems 116 and/or one or more aviation monitoring systems 118. For example, a weather monitoring system 116 may be realized as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. In this regard, the external weather monitoring system(s) 116 may provide weather information and/or data that is more comprehensive and/or robust than what the equipment onboard the aircraft 120 is capable of measuring or otherwise obtaining, or weather information and/or data that is otherwise unavailable using the equipment onboard the aircraft 120. The aviation monitoring system 118 may be realized as SIGMET reporting system (or data feed), NOTAM reporting system (or data feed), PIREP reporting system (or data feed), an aircraft report (AIREP) reporting system (or data feed), an airmen's meteorological information (AIRMET) reporting system (or data feed), a METAR monitoring system, an aircraft situation display to industry (ASDI) reporting system (or data feed), a central flow management unit (CMFU), an automatic dependent surveillance-broadcast (ADS-B) system, an airport delay reporting system (or data feed), or the like, that is capable of providing information and/or data pertaining to the air traffic and/or congestion, SIGMET advisories, AIRMET advisories, NOTAMs, PIREPs, AIREPs, METAR information, airport delays, airspace flow program (AFP) delays, ocean tracks, flow constrained areas (FEAs), flow evaluation areas (FEAs), terminal aerodrome forecasts (TAFs), runway visual ranges (RVRs), diversion summaries, volcanic ash, and the like. In this regard, the aviation monitoring system 118 may provide aviation-related information and/or data that is more comprehensive and/or robust than what is available onboard the aircraft 120, or aviation-related information and/or data that is otherwise unavailable using the equipment onboard the aircraft 120.

In an exemplary embodiment, the processing system 112 generally represents the hardware, software, and/or firmware components configured to receive or otherwise obtain weather and/or other aviation related information from one or more external monitoring systems 116, 118 (e.g., via communications system 110), receive information pertaining to the current position (or location) of the aircraft 120 (e.g., via communications systems 110, 130), render or otherwise display flight tracking images on the display device 108, and perform additional processes, tasks and/or functions to support operation of the flight tracking system 100, as described in greater detail below. Depending on the embodiment, the processing system 112 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 112 includes processing logic that may be configured to carry out the functions, techniques, and processing tasks associated with the operation of the flight tracking system 100 described in greater detail below. Furthermore, the steps of a method or algorithm described in connection with the embodiments disclosed herein may be embodied directly in hardware, in firmware, in a software module executed by the processing system 112, or in any practical combination thereof In accordance with one or more embodiments, the processing system 112 includes or otherwise accesses a computer-readable medium, such as a memory or another suitable non-transitory short or long term storage media, which is capable of storing computer-executable programming instructions or other data for execution that, when read and executed by the processing system 112, cause the processing system 112 to execute and perform one or more of the processes tasks, operations, and/or functions described herein.

As described in greater detail below, in an exemplary embodiment, the processing system 112 includes or otherwise accesses a data storage element 114 that supports rendering and/or display of a flight tracking map on the display device 108 that includes a graphical representation of the aircraft 120 overlying a graphical representation of the terrain in the vicinity of the aircraft 120, wherein the aircraft graphic is positioned over the terrain background in a manner that accurately reflects the current (e.g., instantaneous or substantially real-time) real-world positioning of the aircraft 120 relative to the earth. The data storage element 114 may be realized as a terrain database, an obstacle database, a navigational database, a geopolitical database, a terminal airspace database, a special use airspace database, or a combination thereof In this regard, in addition to the graphical representation of terrain, the flight tracking map displayed on the display device 108 may include graphical representations of navigational reference points (e.g., waypoints, navigational aids, distance measuring equipment (DMEs), very high frequency omnidirectional radio ranges (VORs), and the like), designated special use airspaces, obstacles, and the like which are in the vicinity of the aircraft 120 overlying the terrain on the flight tracking map. In an exemplary embodiment, the data storage element 114 also stores or otherwise maintains information pertaining to the scheduled flight plan (or flight path) for the aircraft 120, so that the processing system 112 may render or otherwise display the projected flight path for the aircraft 120 on the flight tracking map.

As described in greater detail below in the context of FIGS. 2-3, the processing system 112 also renders or otherwise displays graphical representations of the meteorological and/or other aviation-related information received from external monitoring systems 116, 118 overlying the flight tracking map. In this manner, the flight tracking map displayed on the display device 108 may also include graphical representations of regions of precipitation, turbulence, convection, winds, icing, air traffic, and the like overlying the terrain background. In an exemplary embodiment, during operation of the flight tracking system 100, when the meteorological and/or other aviation-related information received from more external monitoring systems 116, 118 is likely to impact operation of the aircraft 120, the ground personnel at the flight tracking station 104 manipulates the user input device 106 to capture a flight tracking image that corresponds to the currently displayed state of the flight tracking map at the time of capture. The ground personnel at the flight tracking station 104 also manipulates the user input device 106 to input or otherwise provide textual messages and/or information associated with the captured flight tracking image and communicate the captured flight tracking image and accompanying text to the aircraft 120 for display on the display device 122 onboard the aircraft 120. As described in greater detail below, in accordance with one exemplary embodiment, the ground personnel at the flight tracking station 104 manipulates the user input device 106 to display the projected flight path corresponding to the originally scheduled flight plan for the aircraft 120 on the flight tracking map, modify one or more navigational reference points of the flight plan on the flight tracking map to create modified flight plan that avoids any regions identified by one of the external monitoring systems 116, 118 that may interfere with operation of the aircraft 120 (e.g., regions of high turbulence, convection, precipitation, air traffic, or the like), and capture a flight tracking image that includes a graphical representation of the projected flight path of the modified flight plan along with the graphical representation of the information identified by and/or received from the external monitoring systems 116, 118. In this manner, the pilot of the aircraft 120 can concurrently view, on the display device 122, the projected flight path for the original flight plan, the projected flight path for the modified flight plan provided by the ground personnel, the graphical representation(s) of the information received from the external system(s) 116, 118 that motivated the modified flight plan, the relationship of the current location of the aircraft 120 with respect to the projected flight paths and/or the potentially interfering regions identified by the external system(s) 116, 118, and the textual messages and/or information provided by the ground personnel at the flight tracking station 104 that explains the modified flight plan and/or the potentially interfering regions identified by external system(s) 116, 118. As a result, the pilot's situational awareness is improved when making a determination as to how to continue operating the aircraft 120.

Still referring to FIG. 1, in an exemplary embodiment, the aircraft 120 includes, without limitation, a display device 122, a user input device 124, an audio output device 125, a processing system 126, a display system 128, a communications system 130, a navigation system 132, a flight management system (FMS) 134, and one or more avionics systems 136. The display device 122 is an electronic display capable of graphically displaying flight information or other data associated with operation of the aircraft 120 under control of the display system 128 and/or processing system 126. In this regard, the display device 122 is coupled to the display system 128 and the processing system 126, wherein the processing system 126 and the display system 128 are cooperatively configured to display, render, or otherwise convey one or more graphical representations or images associated with operation of the aircraft 120 on the display device 122. For example, in accordance with one embodiment, the processing system 126 and the display system 128 are cooperatively configured to render or otherwise display a synthetic terrain display (or synthetic vision display), which is a virtual or computer simulated three-dimensional view of terrain rendered in a conformal manner that emulates a forward-looking view from the cockpit of the aircraft 120.

The user input device 124 is coupled to the processing system 126, and the user input device 124 and the processing system 126 are cooperatively configured to allow a user (e.g., a pilot, co-pilot, or crew member) to interact with the display device 122 and/or other elements onboard the aircraft 120. Depending on the embodiment, the user input device 124 may be realized as a keypad, touchpad, keyboard, mouse, touch panel (or touchscreen), joystick, knob, line select key or another suitable device adapted to receive input from a user, such as a microphone, audio transducer, audio sensor, or another audio input device. The audio output device 125 is coupled to the processing system 126, and the audio output device 125 and the processing system 126 are cooperatively configured to provide auditory feedback to a user. Depending on the embodiment, the audio output device 125 may be realized as a speaker, headphone, earphone, earbud, or another suitable device adapted to provide auditory output to a user.

The processing system 126 generally represents the hardware, software, and/or firmware components configured to facilitate communications and/or interaction with the flight tracking station 104 (e.g., via communications system 130) to receive and display uplinked data link messages on the display device 122 and perform additional processes, tasks and/or functions to support operation of the flight tracking system 100, as described in greater detail below. Depending on the embodiment, the processing system 126 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 126 includes processing logic that may be configured to carry out the functions, techniques, and processing tasks associated with the operation of the flight tracking system

100 described in greater detail below. Furthermore, the steps of a method or algorithm described in connection with the embodiments disclosed herein may be embodied directly in hardware, in firmware, in a software module executed by the processing system 126, or in any practical combination thereof In accordance with one or more embodiments, the processing system 126 includes or otherwise accesses a computer-readable medium, such as a memory or another suitable non-transitory short or long term storage media, which is capable of storing computer-executable programming instructions or other data for execution that, when read and executed by the processing system 126, cause the processing system 126 to execute and perform one or more of the processes tasks, operations, and/or functions described herein.

The display system 128 generally represents the hardware, software, and/or firmware components configured to control the display and/or rendering of one or more displays pertaining to operation of the aircraft 120 and/or systems 130, 132, 134, 136 on the display device 122 (e.g., synthetic vision displays, navigational maps, and the like). In this regard, the display system 128 may access or include one or more databases suitably configured to support operations of the display system 128, such as, for example, a terrain database, an obstacle database, a navigational database, a geopolitical database, a terminal airspace database, a special use airspace database, or other information for rendering and/or displaying content on the display device 122.

Still referring to FIG. 1, in an exemplary embodiment, the navigation system 132 provides real-time navigational data and/or information regarding operation of the aircraft 120 to the processing system 126 and/or display system 128 to support rendering the synthetic vision display on the display device 122. The navigation system 132 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 132, as will be appreciated in the art. The navigation system 132 is capable of obtaining and/or determining the instantaneous position of the aircraft 120, that is, the current (or instantaneous) location of the aircraft 120 (e.g., the current latitude and longitude) and the current (or instantaneous) altitude (or above ground level) for the aircraft 120. The navigation system 132 is also capable of obtaining or otherwise determining the heading of the aircraft 120 (i.e., the direction the aircraft is traveling in relative to some reference).

In the illustrated embodiment, the processing system 126 is coupled to the communications system 130, which is configured to support communications to and/or from the aircraft 120. In exemplary embodiments, the communications system 130 is realized as a data link system or another suitable radio communication system that supports communications between the aircraft 120 and the flight tracking station 104. Additionally, the communications system 130 may also support communications between the aircraft 120 and air traffic control or another command center or ground location. The processing system 126 is also coupled to the FMS 134, which is coupled to the navigation system 132, the communications system 130, and one or more additional avionics systems 136 to support navigation, flight planning, and other aircraft control functions in a conventional manner, as well as to provide real-time data and/or information regarding the operational status of the aircraft 120 to the processing system 126.

It should be understood that FIG. 1 is a simplified representation of the flight tracking system 100 for purposes of explanation and ease of description, and FIG. 1 is not intended to limit the application or scope of the subject matter described herein in any way. Practical embodiments of the flight tracking system 100 and/or aircraft 120 will include numerous other devices and components for providing additional functions and features, as will be appreciated in the art. Although FIG. 1 depicts a single avionics system 136, in practice, the aircraft 120 will likely include numerous avionics systems for obtaining and/or providing real-time flight-related information that may be displayed on the display device 122 or otherwise provided to a user (e.g., a pilot, a co-pilot, or crew member). For example, practical embodiments of the aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system. Furthermore, in some embodiments, the display device 122, the user input device 124, the audio output device 125, and/or the processing system 126 may be implemented as an electronic flight bag that is separate from the aircraft 120 but capable of being communicatively coupled to the other elements of the aircraft 120 when onboard the aircraft 120. Additionally, although FIG. 1 shows a single display device 122, in practice, additional display devices may be present onboard the aircraft 120. Lastly, it should be noted that in other embodiments, features and/or functionality of processing system 126 described herein can be implemented by or otherwise integrated with the features and/or functionality provided by the display system 128 or the FMS 134. In other words, some embodiments may integrate the processing system 126 with the display system 128 or the FMS 134, that is, the processing system 126 described herein may be a component of the display system 128 and/or the FMS 134.

Figure 2:
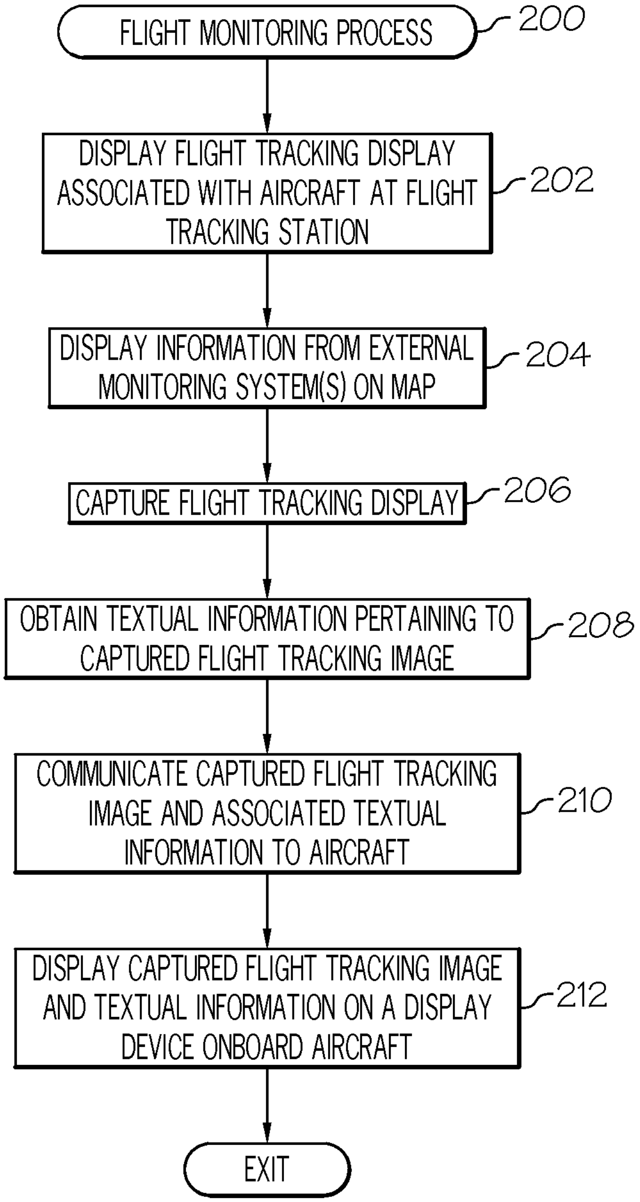
FIG. 2 is a flow diagram of an exemplary flight monitoring process suitable for use with the flight tracking system of FIG. 1 in accordance with one or more embodiments.

Referring now to FIG. 2, in an exemplary embodiment, the flight tracking system 100 is configured to perform a flight monitoring process 200 and additional tasks, functions, and operations described below. The various tasks performed in connection with the illustrated process 200 may be performed by software, hardware, firmware, or any combination thereof. For illustrative purposes, the following description may refer to elements mentioned above in connection with FIG. 1. In practice, portions of the flight monitoring process 200 may be performed by different elements of the flight tracking system 100, such as, the user input device 106, the display device 108, the communications system 110, the processing system 112, the weather monitoring system 116, the aviation monitoring system 118, the display device 122, the user input device 124, the processing system 126, the display system 128, and/or the communications system 130. It should be appreciated that the flight monitoring process 200 may include any number of additional or alternative tasks, the tasks need not be performed in the illustrated order and/or the tasks may be performed concurrently, and/or the flight monitoring process 200 may be incorporated into a more comprehensive procedure or process having additional functionality not described in detail herein. Moreover, one or more of the tasks shown and described in the context of FIG. 2 could be omitted from a practical embodiment of the flight monitoring process 200 as long as the intended overall functionality remains intact.

Still referring to FIG. 2, and with continued reference to FIG. 1, in an exemplary embodiment, the flight monitoring process 200 begins by rendering or otherwise displaying a flight tracking display associated with an aircraft being monitored on a display device at a flight tracking station on the ground (task 202). In accordance with one or more embodiments, the processing system 112 obtains the current location of the aircraft 120 (e.g., from the navigation system 132 and/or FMS 134 via communications systems 110, 130), and based on the location of the aircraft 120, the processing system 112 utilizes the information in the data storage element 114 to display a flight tracking map associated with the aircraft 120 on the display device 108. In this regard, the flight tracking map includes a background corresponding to a graphical representation of the terrain, topology, or other suitable items or points of interest within a geographic area proximate the aircraft 120. In various embodiments, the flight tracking map may also include graphical representations of nearby navigational reference points along with airspace designations and/or airspace restrictions, cities, towns, roads, railroads, and other geo-political information for the depicted geographic area. In an exemplary embodiment, the processing system 112 displays a graphical representation of the aircraft 120 overlying the terrain background and automatically updates or refreshes the flight tracking map as the aircraft travels 120 such that the aircraft graphic is positioned over the terrain background in a manner that accurately reflects the current (e.g., instantaneous or substantially real-time) real-world positioning of the aircraft 120 relative to the earth. In some embodiments, the aircraft 120 may be shown as traveling across the flight tracking map (e.g., by updating the location of the aircraft graphic with respect to the background), while in other embodiments, the aircraft graphic may be located at a fixed position on the flight tracking map (e.g., by updating the background with respect to the aircraft graphic such that the map is maintained centered on and/or aligned with the aircraft graphic). In an exemplary embodiment, the flight tracking map includes a graphical representation of the projected flight path for the aircraft 120 based on the originally scheduled flight plan for the aircraft 120 that overlies the terrain background, such that the ground personnel tracking the aircraft 120 at the flight tracking station 104 can visually observe the upcoming flight path in relation to the current location of the aircraft 120 and/or the neighboring terrain, navigational reference points, points of interest, and the like.

In an exemplary embodiment, the flight monitoring process 200 continues by rendering or otherwise displaying information received from one or more external monitoring systems on the flight tracking map (task 204). In this regard, for information received from one or more external monitoring systems 116, 118, the processing system 112 may determine the geographic area and/or location corresponding to the received information and display a graphical representation of the received information on the flight tracking map that is positioned over the terrain background in a manner that accurately reflects real-world positioning of the received information relative to the earth and/or the aircraft 120. For example, the processing system 112 may receive information from a weather monitoring system 116 indicative of one or more meteorological regions (e.g., one or more regions of precipitation, turbulence, icing, convection, winds and/or wind shear, cloud cover, or the like) and display graphical representation(s) of the meteorological region(s) on the flight tracking map. In other embodiments, the processing system 112 may receive information from one or more aviation monitoring systems 118 indicative of one or more navigational regions of interest (e.g., a region experiencing air traffic congestion, a region covered by temporary flight restrictions, or a region corresponding to a SIGMET, NOTAM, PIREP, or the like) and display graphical representation(s) of the region(s) identified by the aviation monitoring system(s) 118 on the flight tracking map. It should be noted that in practice, any number of meteorological regions indicated by the weather monitoring system(s) 116 and any number of navigational regions of interest indicated by the aviation monitoring system(s) 118 may be displayed on the flight tracking map concurrently. Further, it should be noted that in some embodiments, the ground personnel operating the flight tracking station 104 may manipulate the user input device 106 to selectively display a subset of the regions identified by the external monitoring systems 116, 118. For example, the flight tracking map may include a graphical user interface (GUI) element (e.g., a check box, drop-down menu, radio button, list box, or the like) that allows the ground personnel to select particular meteorological region(s) identified by the weather monitoring system(s) 116 and/or particular navigational region(s) identified by the aviation monitoring system(s) 118 for display on the flight tracking map while unchecked meteorological region(s) and/or navigational region(s) are not displayed and excluded from the flight tracking map.

In an exemplary embodiment, the flight monitoring process 200 continues by capturing the flight tracking display in response to user input from ground personnel operating the flight tracking station (task 206). In this regard, the ground personnel at the flight tracking station 104 manipulates the user input device 106 to capture, copy, record, or otherwise store the displayed flight tracking map at a particular instant in time to obtain a captured flight tracking image that corresponds to a screenshot (or screengrab) of the flight tracking map (or a cropped portion thereof) at the instant in time the user input device 106 is manipulated to initiate the capture. For example, when the ground personnel at the flight tracking station 104 observes a meteorological region(s) and/or navigational region(s) that overlaps a portion of the upcoming flight path for the aircraft 120 or is otherwise likely to impact operation of the aircraft 120, the ground personnel may manipulate the user input device 106 to capture or otherwise record the current state of the flight tracking map that depicts the relationship of the meteorological region(s) and/or navigational region(s) with respect to the current location of the aircraft 120 and/or the projected flight path for the aircraft 120. The captured flight tracking image is communicated or otherwise transmitted to the aircraft 120 for display on the display device 122, thereby allowing the pilot and/or co-pilot of the aircraft 120 to make his or her own assessment of the potential impact of the displayed meteorological region(s) and/or navigational region(s) on operation of the aircraft 120. As described below in the context of FIG. 3, in accordance with one or more embodiments, prior to capturing the flight tracking map, the ground personnel at the flight tracking station 104 manipulates the user input device 106 to modify at least a portion of the upcoming flight path of the aircraft 120 to deviate from the original flight plan to circumnavigate or otherwise avoid the meteorological region(s) and/or navigational region(s) that would otherwise be likely to impact operation of the aircraft 120.

Still referring to FIG. 2, in an exemplary embodiment, the flight monitoring process 200 continues by receiving or otherwise obtaining textual information pertaining to the captured flight tracking image (task 208). In this regard, the ground personnel at the flight tracking station 104 manipulates the user input device 106 to provide a comment, message, or other textual information that annotates, explains, or otherwise elucidates the captured flight tracking image. For example, when the ground personnel at the flight tracking station 104 may manipulate the user input device 106 to express textually his or her assessment of the potential impact of the meteorological region(s) and/or navigational region(s) displayed in the captured flight tracking image with respect to upcoming operation of the aircraft 120. As described in greater detail below, the obtained textual information is communicated or otherwise transmitted to the aircraft 120 with the captured flight tracking image for display on the display device 122, thereby allowing the pilot and/or co-pilot of the aircraft 120 to review the ground personnel's assessments and/or comments regarding the captured flight tracking image. In accordance with one embodiment, the processing system 112 may display a GUI element adapted to receive textual input (e.g., a text box or the like) on the display device 108, wherein the ground personnel at the flight tracking station 104 manipulates the user input device 106 to provide the textual information associated with the captured flight tracking image before or after capturing the flight tracking image. For example, a text box may be displayed on the flight tracking map, thereby allowing the ground personnel to provide textual information pertaining to the flight tracking map prior to capturing the flight tracking image, such that the textual information is embedded within the captured flight tracking image. In other embodiments, before or after capturing the flight tracking image, the processing system 112 may display a text box on the display device 108 that is outside of or otherwise separate from the flight tracking map for receiving textual information to be provided to the aircraft 120 with the captured flight tracking image. In such embodiments, after the ground personnel finishes entering the textual information pertaining to the captured flight tracking image, the processing system 112 may store or otherwise maintain the obtained textual information in association with the captured flight tracking image.

In an exemplary embodiment, the flight monitoring process 200 continues by communicating the captured flight tracking image and associated textual information from the flight tracking station on the ground to the aircraft (task 210). For example, in accordance with one embodiment, the processing system 112 creates a data link message by appending or otherwise attaching the textual information and the captured flight tracking image. In this regard, the captured flight tracking image and the textual information may be contemporaneously and/or concurrently transmitted to the aircraft 120. In other embodiments, if the textual information is embedded or otherwise contained in the captured flight tracking image, the processing system 112 may create a data link message using only the captured flight tracking image which includes the captured flight tracking image. After creating the data link message, the processing system 112 provides the data link message to the communications system 110 for transmission to the aircraft 120. The communications system 110 then transmits the data link message from the station 140 to the communications system 130 onboard the aircraft 120 in a conventional manner. In an exemplary embodiment, the data link message including the captured flight tracking image and associated textual information is uplinked or otherwise uploaded to the aircraft 120 by the communications system 110 without any affirmative action by the pilot and/or co-pilot of the aircraft 120. To put it another way, the data link message is pushed to the aircraft 120 such that the aircraft 120 receives the data link message and the pilot and/or co-pilot is notified of the data link message substantially in real-time. It should be noted that in alternative embodiments, the processing system 112 may create separate data link messages for the captured flight tracking image and the associated textual information which are transmitted to the aircraft 120 successively.

In the illustrated embodiment, the flight monitoring process 200 then continues by displaying data link message on the display device onboard the aircraft (task 214). In response to receiving the uplinked data link message, the processing system 126 may display a notification on the display device 122 that indicates the presence of a new uplinked data link message available for viewing. In response to a pilot and/or co-pilot manipulating the user input device 124 to select the uplinked data link message for display, the processing system 126 renders or otherwise displays the captured flight tracking image on the display device 122. In accordance with one embodiment, the captured flight tracking image is rendered on the display device 122 overlying the synthetic vision display or other primary flight display. In an exemplary embodiment, the textual information pertaining to the captured flight tracking image is also displayed on the display device 122 and graphically associated with the captured flight tracking image. For example, the processing system 126 may display a window on the display device 122 that includes the captured flight tracking image with the textual information appended to the captured flight tracking image within the window (e.g., above, below, or alongside). In this regard, the pilot and/or co-pilot may scroll or otherwise manipulate the window to view portions of the captured flight tracking image and/or the textual information. In other embodiments, the processing system 126 may display the associated textual information on the display device 122 proximate the captured flight tracking image (e.g., in a window adjacent to a window containing the flight tracking image) or overlying the captured flight tracking image, such that the captured flight tracking image and its associated textual information are displayed on the display device 122 concurrently and graphically associated due to their proximity on the display device 122. The pilot and/or co-pilot may view the captured flight tracking image to ascertain the positioning and/or relationship of the meteorological region(s) and/or navigational region(s) identified by the external system(s) 116, 118 with respect to current location of the aircraft 120 and/or the upcoming flight path of the aircraft 120 and any modifications to the upcoming flight path proposed by the ground personnel. At the same time, the pilot and/or co-pilot may also view or otherwise access the ground personnel's comments regarding the displayed meteorological region(s), the displayed navigational region(s) and/or the modified flight path. Based on the cumulative information, the pilot and/or co-pilot may better assess the potential impact of the displayed meteorological region(s) and/or navigational region(s) and determine how to proceed operating the aircraft 120 with improved situational awareness.

Figure 3:
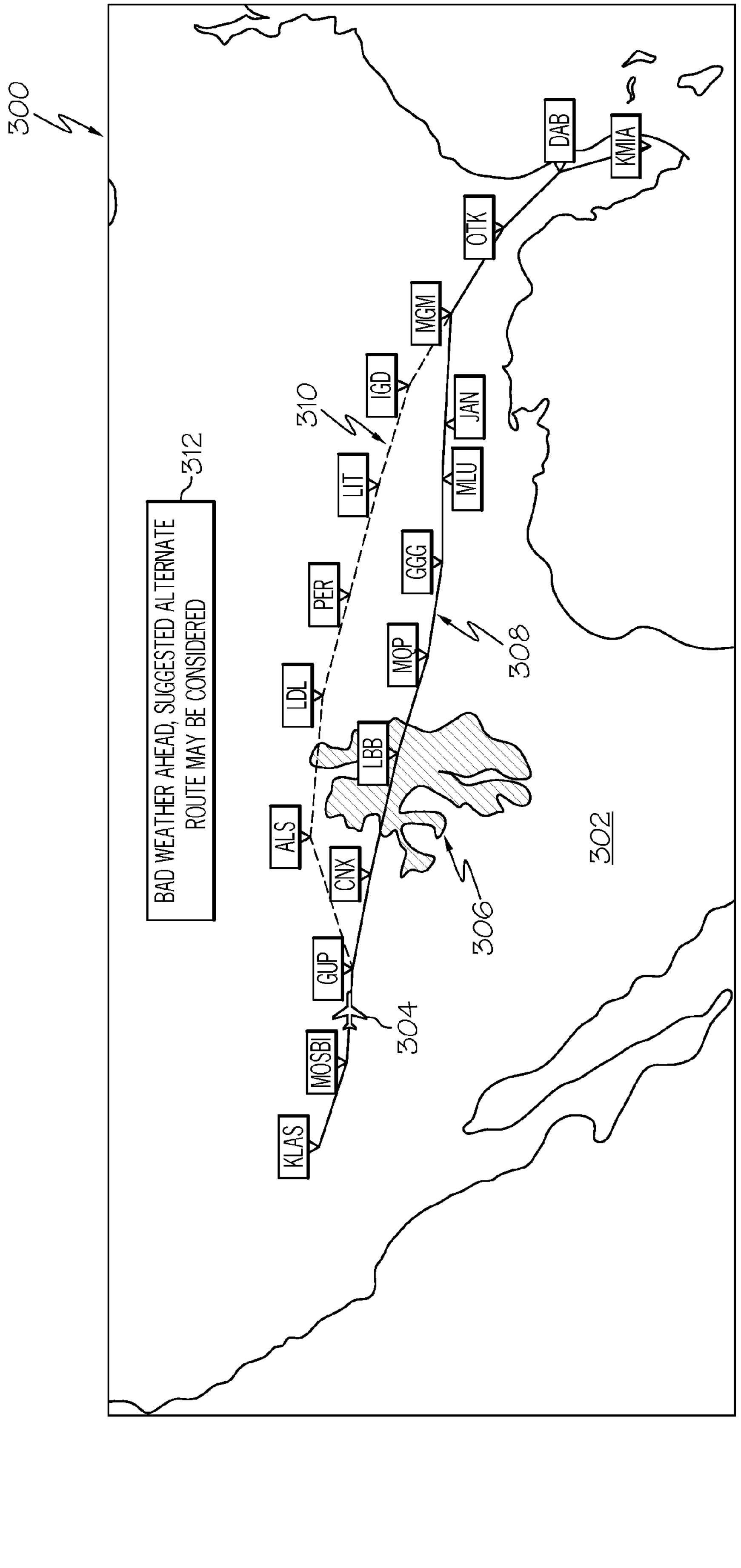
FIG. 3 depicts an exemplary flight tracking image display suitable for display onboard the aircraft in the flight tracking system of FIG. 1 in accordance with the exemplary flight monitoring process of FIG. 2.

FIG. 3 depicts an exemplary flight tracking image 300 that may be displayed on a display device onboard an aircraft in accordance with the flight monitoring process 200 of FIG. 2. Referring to FIG. 3, and with reference to FIGS. 1-2, as described above, in an exemplary embodiment, the processing system 112 obtains the current location of the aircraft 120 and displays a flight tracking map on the display device 108 that includes the terrain background 302, which graphically represents the terrain, topology, and geopolitical information for the geographic area depicted in the flight tracking map. The processing system 112 also displays the graphical representation 304 of the aircraft 120 that is positioned overlying the terrain background 302 in a manner that accurately reflects the current location and heading of the aircraft 120. As illustrated, the processing system 112 also displays graphical representations of a region 306 that is identified or otherwise indicated by an external monitoring system 116, 118. For example, in the illustrated embodiment, the processing system 112 displays a meteorological region 306 identified by the weather monitoring system 116 overlying the terrain background 302. However, it should be noted that in other embodiments, the region 306 may be realized as a navigational region identified by an aviation monitoring system 118 (e.g., a region of air traffic congestion, a SIGMET region, or the like).

In the illustrated embodiment, the flight tracking image 300 also includes graphical representations of a projected flight paths for the aircraft 120. In this regard, the flight tracking image 300 includes a graphical representation of a modified flight path 310 based on a modified flight plan created by the ground personnel at the flight tracking station 104 along with a graphical representation of the currently projected flight path 310 based on the original flight plan for the aircraft 120. For example, in response to identifying the meteorological region 306 overlaps an upcoming portion of the original flight path 308, the ground personnel at the flight tracking station 104 may manipulate the user input device 106 to create the modified flight path 310 on the flight tracking map that avoids or otherwise circumnavigates the meteorological region 306. As illustrated, the graphical representations the flight paths 308, 310 include graphical representations of the individual navigational reference points that define the respective flight paths 308, 310 along with graphical representations of the navigational segments between successive navigational reference points of the respective flight path 308, 310. In an exemplary embodiment, the two flight paths 308, 310 are displayed using different visually distinguishable characteristics (e.g., visually distinguishable color, hue, tint, brightness, graphically depicted texture or pattern, contrast, transparency, opacity, shading, animation, and/or other graphical effects) such that the modified flight path 310 can be readily ascertained and distinguished from the original flight path 310, and vice versa.

After creating the modified flight path 310, the ground personnel at the flight tracking station 104 may provide textual information to explain the modified flight path 310 to the pilot and/or co-pilot of the aircraft 120 prior to capturing and communicating the flight tracking image 300 to the aircraft 120. For example, in one embodiment, the ground personnel may manipulate the user input device 106 to create a text box 312 overlying the terrain background 302 and provide textual information pertaining to the modified flight path 310 that is graphically presented in the text box 312. After providing the textual information, the ground personnel manipulates the user input device 106 to capture the flight tracking image 300 that includes the graphical representation of the modified flight plan 310 overlying the terrain background 302 along with the textual information (e.g., in text box 312) that pertains to the captured flight tracking image 300. The processing system 112 creates a data link message containing the captured flight tracking image 300 and uplinks the data link message to the aircraft 120 via communications systems 110, 130. It should be noted that in some embodiments, instead of embedding the textual information in the flight tracking image, the textual information pertaining to the captured flight tracking image may be separately obtained by the processing system 112 and appended to the captured flight tracking image 300 to create the data link message, as described above in the context of FIG. 2.

In an exemplary embodiment, in response to receiving the uplinked data link message, the processing system 126 displays a notification on the display device 122 that indicates the presence of a new uplinked data link message. In response to a pilot and/or co-pilot manipulating the user input device 124 to select the uplinked data link message for display, the processing system 126 renders or otherwise displays the captured flight tracking image 300 on the display device 122. In the illustrated embodiment, the textual information pertaining to the captured flight tracking image 300 is embedded within the flight tracking image 300 (e.g., in text box 312) so that the textual information and the captured flight tracking image 300 are concurrently displayed on the display device 122. In other embodiments, where the textual information is not embedded in the captured flight tracking image 300, the processing system 126 may display the textual information appended to captured flight tracking image in the data link message in a text box (e.g., text box 312) overlying the flight tracking image 300 or proximate to the captured flight tracking image 300 to graphically indicate the association between the textual information and the captured flight tracking image 300 displayed on the display device 122. For the captured flight tracking image 300 illustrated in FIG. 3, the pilot and/or co-pilot of the aircraft 120 may concurrently view the current location of the aircraft 120 (e.g., aircraft graphic 304), the original flight path 308, the modified flight path 310 proposed by the ground personnel, the positioning and/or relationship of the meteorological region 306 with respect to the aircraft 120 and/or the flight paths 308, 310, and the comments and/or feedback provided by the ground personnel monitoring the aircraft 120 at the flight tracking station 104. The pilot and/or co-pilot may thereby determine how to proceed operating the aircraft 120 (e.g., determining whether or not to execute the modified flight path 310 or stay on the original flight path 308) with improved situational awareness.

Figure 4:
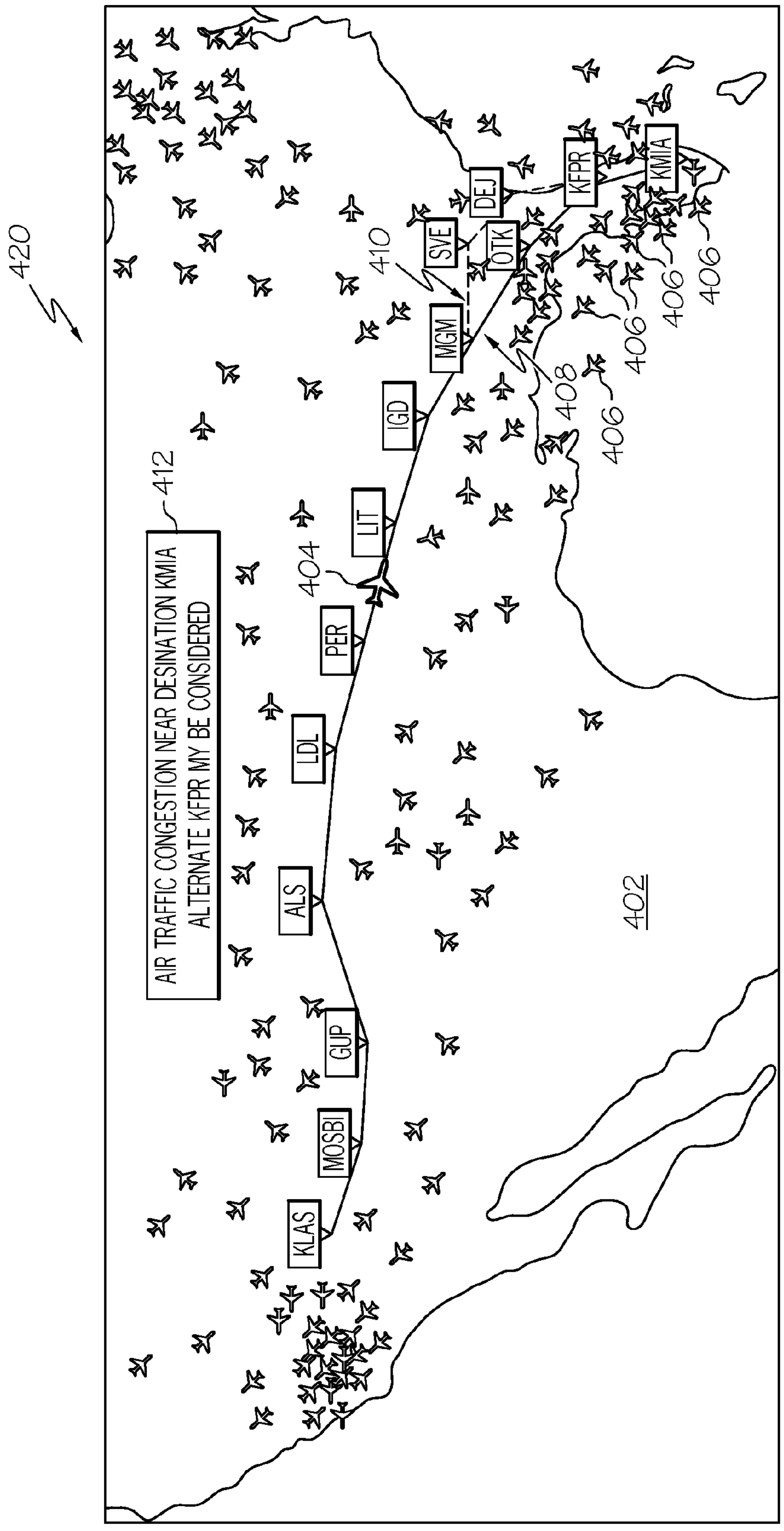
FIG. 4 depicts another exemplary flight tracking image display suitable for display onboard the aircraft in the flight tracking system of FIG. 1 in accordance with the exemplary flight monitoring process of FIG. 2.

FIG. 4 depicts another exemplary flight tracking image 400 that may be displayed on a display device onboard an aircraft in accordance with the flight monitoring process 200 of FIG. 2. Referring to FIG. 4, and with reference to FIGS. 1-2, as described above, in an exemplary embodiment, the processing system 112 obtains the current location of the aircraft 120 and displays a flight tracking map on the display device 108 that includes the terrain background 402, which graphically represents the terrain, topology, and geopolitical information for the geographic area depicted in the flight tracking map. The processing system 112 also displays the graphical representation 404 of the aircraft 120 that is positioned overlying the terrain background 402 in a manner that accurately reflects the current location and heading of the aircraft 120. In the illustrated embodiment, the processing system 112 displays graphical representations 406 of air traffic identified by the aviation monitoring system 118 overlying the terrain background 402. It should be noted that although FIG. 4 depicts graphical representations of individual aircraft, in other embodiments, the air traffic may be graphically represented using different visually distinguishable regions to indicate the relative amount of air traffic over different geographic areas.

Still referring to FIG. 4, the illustrated flight tracking image 400 also includes a graphical representation of a modified flight path 410 based on a modified flight plan created by the ground personnel at the flight tracking station 104 along with a graphical representation of the currently projected flight path 410 based on the original flight plan for the aircraft 120. In this regard, in response to identifying relatively heavy air traffic around original destination airport KMIA, the ground personnel at the flight tracking station 104 manipulates the user input device 106 to create the modified flight path 410 on the flight tracking map that has a different destination airport (airport KFPR via navigational reference points SVE and DEJ) to avoid the air traffic at or around airport KMIA (e.g., to avoid incursions and/or delays likely to be caused by the air traffic). As illustrated, the graphical representations the flight paths 408, 410 include graphical representations of the individual navigational reference points that define the respective flight paths 408, 410 along with graphical representations of the navigational segments between successive navigational reference points of the respective flight path 408, 410. In an exemplary embodiment, the two flight paths 408, 410 are displayed using different visually distinguishable characteristics (e.g., visually distinguishable color, hue, tint, brightness, graphically depicted texture or pattern, contrast, transparency, opacity, shading, animation, and/or other graphical effects) such that the modified flight path 410 can be readily ascertained and distinguished from the original flight path 410, and vice versa.

After creating the modified flight path 410, the ground personnel at the flight tracking station 104 provides textual information to explain the modified flight path 410 to the pilot and/or co-pilot of the aircraft 120 prior to capturing and communicating the flight tracking image 400 to the aircraft 120, for example, by manipulating the user input device 106 to create a text box 412 overlying the terrain background 402 that includes textual information pertaining to the modified flight path 410. After providing the textual information, the ground personnel manipulates the user input device 106 to capture the flight tracking image 400 and initiate uplinking a data link message containing the captured flight tracking image 400 to the aircraft 120 via communications systems 110, 130. As described above, in response to receiving the uplinked data link message, the processing system 126 may display a notification on the display device 122 that indicates the presence of a new uplinked data link message, and in response to a pilot and/or co-pilot selecting the uplinked data link message for display, the processing system 126 renders or otherwise displays the captured flight tracking image 400 on the display device 122. In this manner, the modified flight path 410 and the related textual information in text box 412 are concurrently presented to the pilot and/or co-pilot along with the graphical representations 406 of the air traffic motivating the modified flight path 410, thereby allowing the pilot and/or co-pilot to determine whether to execute the modified flight path 410 or the original flight path 408 with improved situational awareness.

Figure 5:
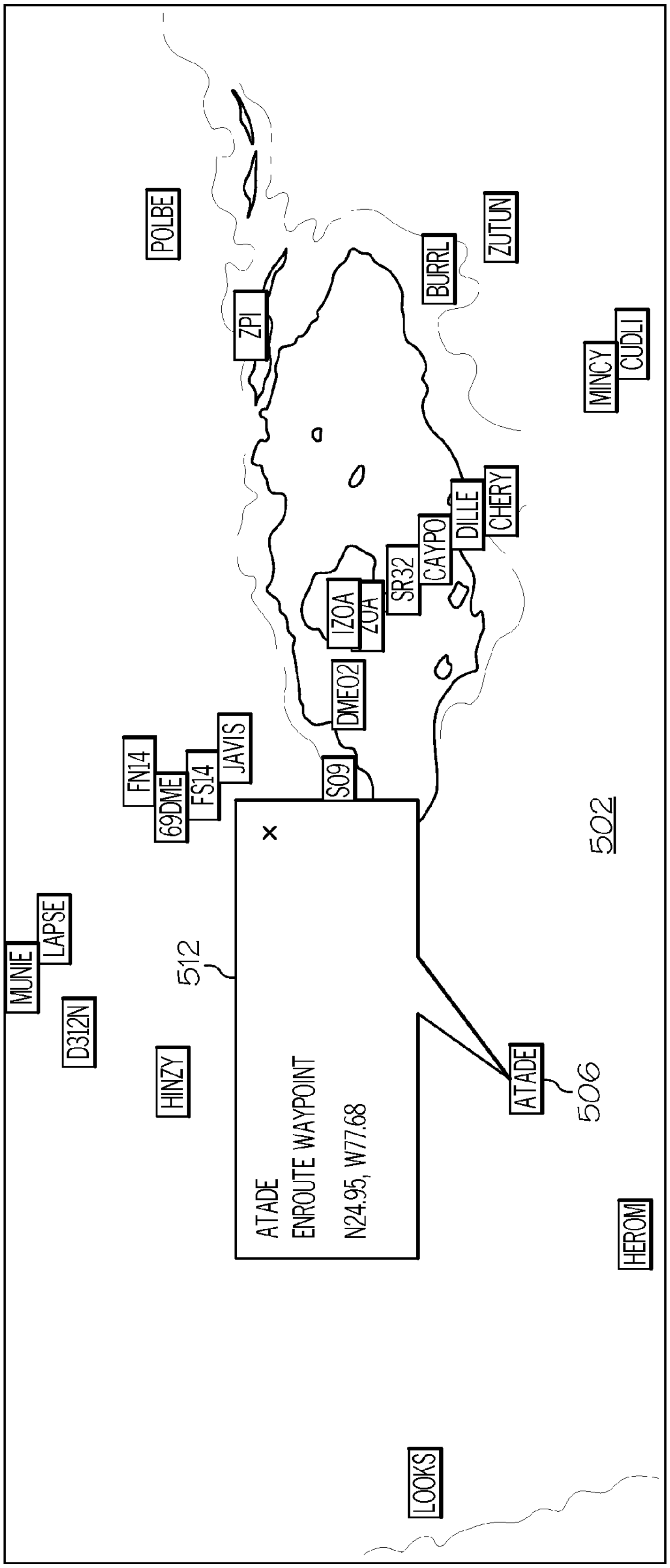
FIG. 5 depicts another exemplary flight tracking image display suitable for display onboard the aircraft in the flight tracking system of FIG. 1 in accordance with the exemplary flight monitoring process of FIG. 2.

FIG. 5 depicts another exemplary flight tracking image 500 that may be displayed on a display device onboard an aircraft in accordance with the flight monitoring process 500 of FIG. 2. Referring to FIG. 5, and with reference to FIGS. 1-2, as described above, in an exemplary embodiment, the processing system 112 displays a flight tracking map on the display device 108 that includes a terrain background 502 for a geographic area likely to be traversed by the aircraft 120. In the illustrated embodiment, the processing system 112 displays a graphical representation 506 of a navigational reference point (which may or may not be part of the current flight plan for the aircraft 120) overlying the terrain background 502. In the illustrated embodiment, the ground personnel at the flight tracking station 104 provides textual information pertaining to the navigational reference point in a text box 512 prior to capturing and communicating the flight tracking image 500 to the aircraft 120. The captured flight tracking image 500 may subsequently be uplinked to the aircraft 120, thereby allowing the graphical representation 506 of a navigational reference point and the related textual information in text box 512 to be concurrently presented to the pilot and/or co-pilot on the display device 122.

For the sake of brevity, conventional techniques related to graphics and image processing, aircraft controls, monitoring systems, flight tracking, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by processing system 112), facilitate capturing and communicating flight tracking images to an aircraft in accordance with the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method of monitoring an aircraft, the method comprising:

displaying, by a computing system at a ground location, an image on a first display device at the ground location, the image being associated with the aircraft and the image including a graphical representation of a region identified by an external system overlying a graphical representation of terrain;

displaying, on the first display device, a graphical representation of a modified flight path for the aircraft on the image overlying the graphical representation of terrain;

capturing the image displayed on the first display device, resulting in a captured image including the graphical representation of the region overlying the graphical representation of terrain and the graphical representation of the modified flight path, the captured image corresponding to a displayed state of the image at the time of the capturing; and communicating the captured image including the graphical representation of the region to the aircraft, wherein the captured image is displayed on a second display device onboard the aircraft.

2. The method of claim 1, further comprising displaying, on the first display device, a map including the graphical representation of the region identified by the external system overlying the graphical representation of terrain, wherein:

the captured image comprises a captured map including the graphical representation of the region overlying the graphical representation of terrain; and communicating the captured image comprises communicating the captured map to the aircraft, wherein the captured map is displayed on the second display device.

3. The method of claim 1, further comprising obtaining, by the computing system, information pertaining to a meteorological region identified by a weather monitoring system coupled to the computing system, wherein the region comprises a graphical representation of the meteorological region.

4. The method of claim 3, wherein the meteorological region is selected from a group consisting of a precipitation region, a turbulence region, an icing region, a convection region, a cloud region, and a wind shear region.

5. The method of claim 3, wherein the information pertaining to the meteorological region is not available using instrumentation onboard the aircraft.

6. The method of claim 1, further comprising obtaining, by the computing system, information pertaining to a navigational region identified by an aviation monitoring system coupled to the computing system, wherein the region comprises a graphical representation of the navigational region.

7. The method of claim 1, further comprising obtaining, by the computing system, information pertaining to a significant meteorological information (SIGMET) region identified by a SIGMET reporting system coupled to the computing system, wherein the region comprises a graphical representation of the SIGMET region.

8. The method of claim 1, further comprising obtaining, by the computing system, information pertaining to the region identified by a notice to airmen (NOTAM) reporting system coupled to the computing system.

9. The method of claim 1, further comprising obtaining, by the computing system, information pertaining to the region identified by a pilot report (PIREP) reporting system coupled to the computing system.

10. The method of claim 1, wherein communicating the captured image comprises:

creating a data link message including the captured image; and providing the data link message to a data link system for transmission to the aircraft.

11. The method of claim 1, wherein the captured image corresponds to a screenshot of the first display device at an instant in time a user input device is manipulated to initiate the capturing.

12. A method of monitoring an aircraft, the method comprising:

capturing, by a computing system at a ground location, a map displayed on a first display device at the ground location, the map including a graphical representation of a region identified by an external system and a graphical representation of a modified flight path for the aircraft, wherein capturing the map results in a captured image including the graphical representation of the region and the graphical representation of the modified flight path and corresponding to the displayed state of the map at the time of the capturing;

obtaining, by the computing system via a user input device at the ground location, textual information pertaining to the captured image;

communicating the captured image to the aircraft for display on a second display device onboard the aircraft; and communicating the textual information to the aircraft for display on the second display device in association with the captured image.

13. The method of claim 12, wherein communicating the textual information comprises:

creating a data link message by appending the captured image and the textual information; and uplinking the data link message to the aircraft.

14. The method of claim 12, further comprising displaying, on the second display device, the textual information concurrently to displaying the captured image.

15. A computer-readable medium having computer-executable instructions or data stored thereon executable by a processing system to:

display, on a first display device at a ground location coupled to the processing system, a map associated with an aircraft;

obtain information from an external system coupled to the processing system;

display a graphical representation of the information obtained from the external system on the map;

display a graphical representation of a modified flight path for the aircraft on the map;

capture the map displayed on the first display device, resulting in a captured image that corresponds to a displayed state of the map at the time of capturing and includes the graphical representation of the information and the graphical representation of the modified flight path overlying a graphical representation of terrain; and communicate the captured image including the graphical representation of the information overlying the graphical representation of terrain to the aircraft for display on a second display device onboard the aircraft.

16. The computer-readable medium of claim 15, wherein the computer-executable instructions or data stored thereon are executable by the processing system to:

create a data link message including the captured image; and provide the data link message to a data link system for transmission to the aircraft.

17. The computer-readable medium of claim 15, wherein:

the information pertains to a meteorological region identified by a weather monitoring system coupled to the processing system; and the information pertaining to the meteorological region is not available using instrumentation onboard the aircraft.

18. The method of claim 1, further comprising displaying, on the first display device, a graphical representation of a projected flight path for the aircraft on the image overlying the graphical representation of terrain prior to capturing the image, resulting in the captured image including the graphical representation of the projected flight path, wherein the graphical representation of the modified flight path and the graphical representation of the projected flight path are displayed using different visually distinguishable characteristics.

19. The method of claim 1, wherein displaying the graphical representation of the modified flight path comprises displaying the graphical representation of the modified flight path in response to manipulation of a user input device coupled to the computing system to modify one or more navigational reference points of a flight plan for the aircraft.

* * * * *